April 27, 1965   R. LEE   3,180,170
POWER TRANSMISSION
Filed April 2, 1962   2 Sheets-Sheet 1

INVENTOR.
ROYAL LEE
BY Christopher L. Waal
ATTORNEY

April 27, 1965    R. LEE    3,180,170
POWER TRANSMISSION
Filed April 2, 1962    2 Sheets-Sheet 2
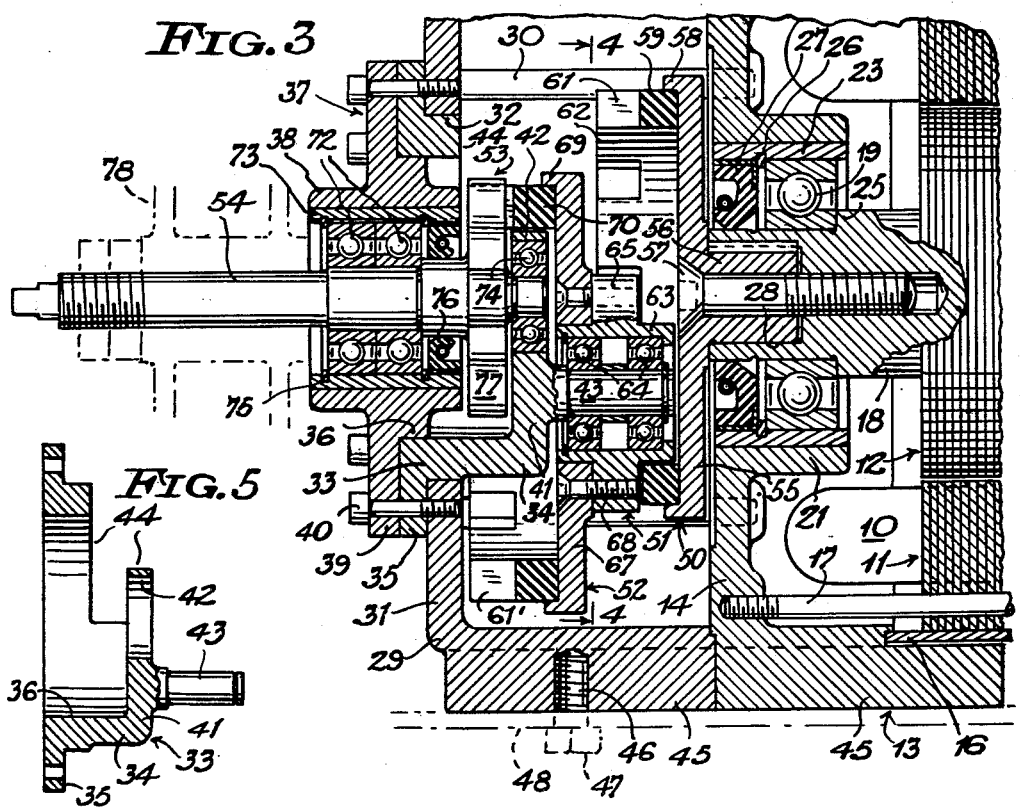
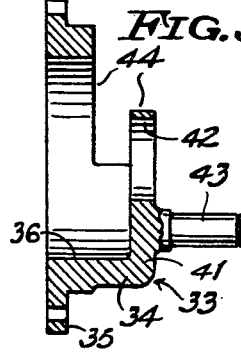
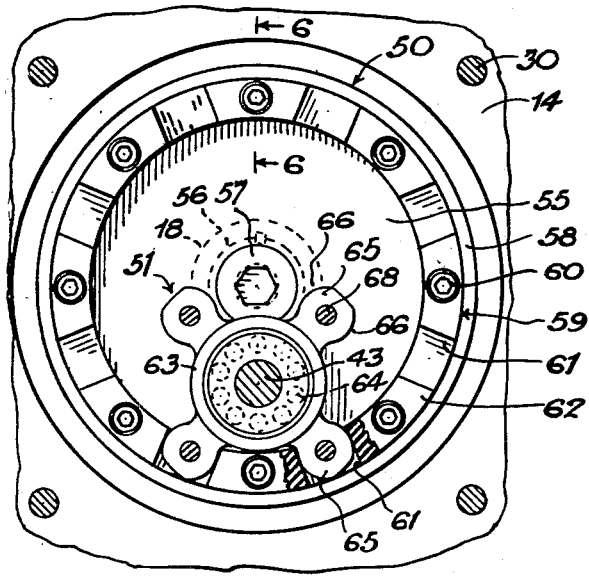
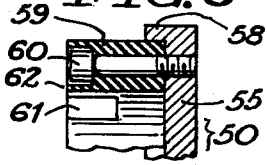
INVENTOR.
ROYAL LEE
BY
Christopher L. Wead
ATTORNEY

United States Patent Office 3,180,170
Patented Apr. 27, 1965

3,180,170
POWER TRANSMISSION
Royal Lee, Box 267, Elm Grove, Wis.
Filed Apr. 2, 1962, Ser. No. 184,243
6 Claims. (Cl. 74—413)

This invention relates to power transmissions.

For certain power applications it is found desirable to rotate a driven member, such as an axial flow air impeller, at a relatively high speed, for example at a speed on the order of 14,000 revolutions per minte. It is advantageous in many instances to be able to use as a power source a conventional induction motor operating on a 60 cycle supply. However, a two-pole 60-cycle induction motor has an operating speed under load on the order of 3500 revolutions per minute, so that an overdrive or speed-increasing transmission would be required to produce the desired high speed of the driven member.

An object of the invention is to provide an improved power transmission of simple, reliable and relatively inexpensive construction by which a driven member, such as an air impeller, can be operated at a relatively high speed from a driving member, such as an electric motor, operating at a much lower speed.

Another object is to provide a compactly arranged power transmission of this character in which a high-speed output shaft is coaxial with the input or motor shaft.

Still another object is to provide a power transmission including improved gearing which at high speed will operate smoothly and without excessive noise.

A further object is to provide a power transmission which will permit easy and accurate machining of the parts and facilitate assembly.

The invention further consists in the several features hereinafter described and claimed.

In the accompanying drawings,

FIG. 3 is a fragmentary longitudinal sectional view of the transmission;

FIG. 4 is a transverse sectional view taken generally on the line 4—4 of FIG. 3;

FIG. 5 is a detail axial sectional view of a bearing bracket, and

FIG. 6 is a detail sectional view of an internal gear of the transmission, taken generally on the line 6—6 of FIG. 4.

Figure 1:
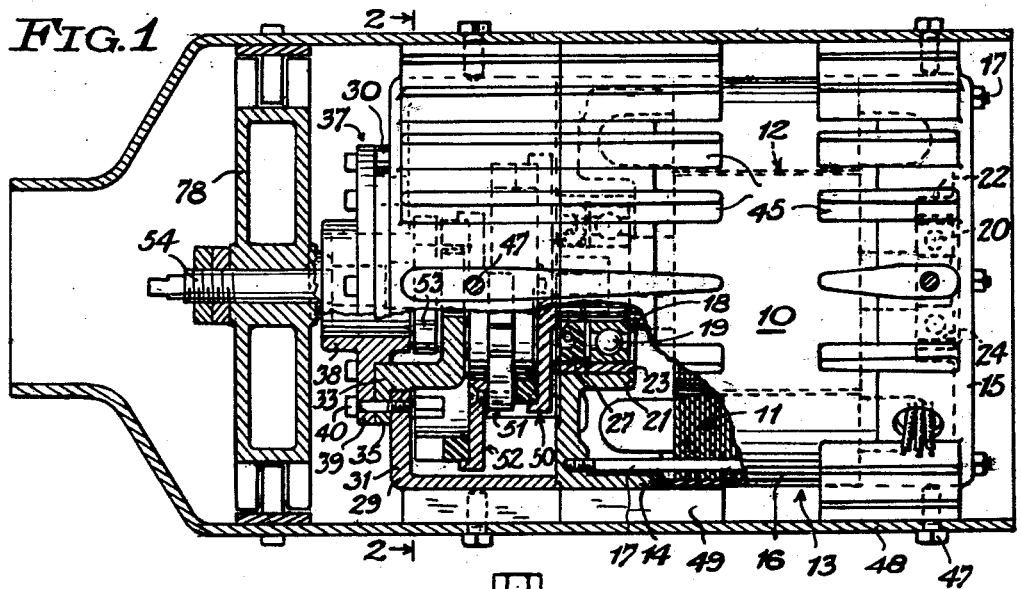
FIG. 1 is a side elevation, partly in section, of a speed-increasing power transmission embodying the invention.

In the drawing, 10 designates an electric motor, such as a three-phase two-pole induction motor of conventional type operating on a 60-cycle supply and having a speed under load on the order of 3450 to 3500 r.p.m. The motor comprises a stator 11 and a cooperating rotor 12 therein, the stator being mounted in a generally cylindrical casing 13 including end bells 14 and 15 and an intervening stator band 16, and the end bells being connected by stud bolts 17. The rotor is carried on a shaft 18 journalled at opposite ends in ball-bearings 19 and 20 mounted in inwardly projecting bosses 21 and 22 formed on the respective end bells. In the case of end bells formed of light metal, such as an aluminum alloy, the bearings are fitted in respective boss liner sleeves or bushings 23 and 24, such as of steel. The ball-bearing 19 is axially confined between an annular shoulder 25 on the rotor shaft and a snap ring 26 in the boss liner sleeve 23. The liner 23 is also provided with a shaft seal 27, and the adjacent end of the motor shaft has an axial bore 28, FIG. 3.

A cup-like cylindrical gear case 29, such as of an aluminum alloy, is rigidly secured to the end bell 14 in coaxial relation thereto, as by screws 30, to house overdrive or speed-increasing gearing hereinafter described, and includes a flat end wall 31 having a central bore or opening 32 coaxial with the motor shaft. A bearing bracket or cage 33, formed of a strong metal such as bronze, includes a cupped portion 34 which fits in the end wall bore 32 and projects into the gear case, and further includes an annular marginal flange 35 abutting against the outer face of the end wall 31, the cupped portion being provided with a coaxial bore 36. A circular cover plate 37 includes a central tubular hub 38, an end portion of which fits in the bracket bore 36, and further includes a disk-like flange 39 which abuts against the bracket flange 35, the two flanges rigidly secured to the gear case end wall, as by screws 40. The cupped portion 34 of the bracket 33 includes an inner wall or web 41 extending parallel to the gear case end wall and provided with a bearing-receiving opening 42 coaxial with the motor shaft. Integrally formed on the bracket inner wall 41 is a stud or pin 43 which extends into the gear case in eccentric parallel relation to the motor shaft axis. At a region diametrically opposite the stud 43 the cupped portion of the bracket is cut away at 44 to clear parts of the gearing. In some instances, the space within the gear case may form a lubricant chamber for the gearing. If the gear case is formed of a sufficiently strong metal, such as bronze, it is possible to form the bearing bracket integral with the gear case, in which case the bracket flange 35 may be omitted.

The end bells 14 and 15 and the gear case are provided with a plurality of longitudinally extending radiating fins 45 some of which are provided with threaded radial openings 46 receiving screws 47 by which the motor may be secured to a support 48 consisting of a surrounding tubular member or shroud, thus forming longitudinal air passages 49 about the motor and gear case.

The speed-increasing gearing within the gear case is a reverted gear train, hereinafter more fully described, comprising an internal gear 50 secured to the motor shaft, a pinion or pinion gear 51 meshing therewith and rotating at twice the speed of the internal gear, a second internal gear 52 secured to the pinion gear, and a second pinion gear 53 meshing with the second internal gear and rotating at twice the speed of the second internal gear. The second pinion gear is carried by an output shaft 54 which is coaxial with the motor shaft and is journalled in the cover plate 37 and bearing bracket 33, as hereinafter described. The output shaft is thus driven at a speed four times the speed of the motor.

The internal gear 50 within the gear case is cup-shaped and is rigidly mounted on and driven by the motor shaft 18. The gear 50 comprises a metal disk 55, such as of an aluminum alloy, having a hub 56, FIG. 3, fitting in and keyed to the axially recessed end of the motor shaft and secured thereto by a central screw 57. The disk includes a cylindrical marginal flange 58 which rigidly confines therein a non-metallic ring gear member or annular insert 59, such as of high-strength Bakelite or Teflon, the insert being secured to the disk by countersunk secrews 60, as seen in FIGS. 4 and 6. Especially in the case of a Bakelite gear insert, a finely divided filler material including molybdenum or its compounds may be incorporated to provide toughness and lubricating qualities. The ring gear insert 59 is of cylindrical shape and is provided in its outer or axial face with a small even plurality of evenly spaced parallel-sided radial slots 61 of equal width which open at the inner and outer peripheries of the ring gear. In the illustrated embodiment, the annular ring gear insert has eight parallel-sided radial slots defining eight intervening wedge-shaped teeth 62, and the countersunk insert-attaching screws 60 pass through mid-portions of the teeth. The radial slots are conveniently and accurately cut or formed as they have parallel sides and extend through an axial face of the ring gear insert.

The eccentrically disposed stud or pin 43 on the bearing bracket 33 projects into the central space of the cup-shaped internal ring gear 50 and rotatably supports the pinion gear 51 which meshes with this ring gear, the pitch diameter of the pinion gear being one-half the pitch diameter of the ring gear. The pinion gear includes a tubular hub portion 63 which is rotatably mounted on the stud by a pair of axially spaced and axially confined ball-bearings 64, the hub portion extending into the central space of the ring gear. The pinion gear 51, which is formed of hardened metal such as steel, has four equally spaced teeth 65, FIG. 4 projecting radially from its hub portion 63, each tooth having a radial center line and opposed hardened and polished contact faces 66 of cylindrical shape, the center of curvature of the contact faces of each tooth lying at the intersection of the tooth center line with the pitch circle, and the tooth diameter being very slightly smaller than the width of the slots in the meshing internal gear. With this arrangement a constant velocity ratio is obtained, and the meshing gears will operate smoothly and without excessive noise. One or two teeth of the pinion gear will always be in mesh with the internal gear.

Figure 2:
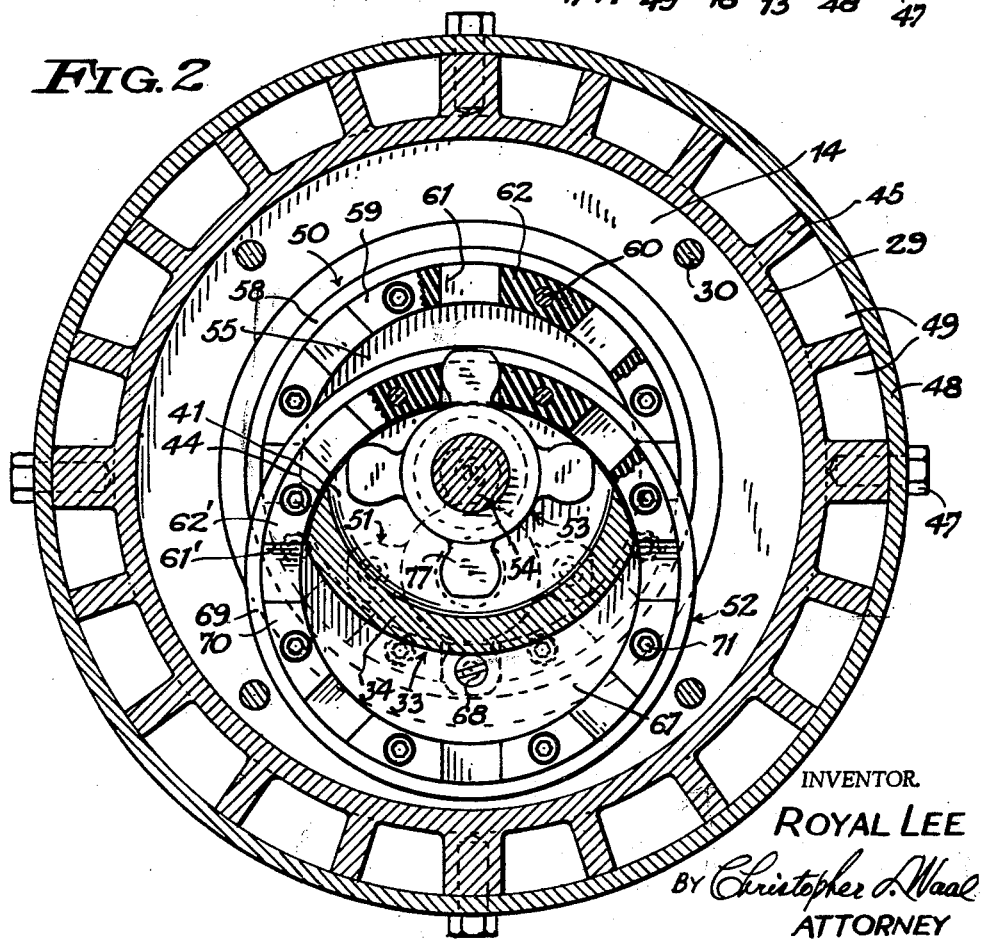
FIG. 2 is a transverse sectional view taken generally on the line 2—2 of FIG. 1.

Rigidly secured to the hubbed pinion gear 51 in coaxial relation thereto is the second internal gear 52 which is cup-shaped and is generally similar to the internal gear 50 and has the same pitch circle. The internal gear 52 includes a metal disk 67 which fits on the front end of the hub 63 of the pinion gear 51 in axial abutment with the flat front faces of the pinion gear teeth 65 and is rigidly fastened to these teeth by screws 68 extending into the midportions of the teeth. The disk 67, desirably formed of a light-weight aluminum alloy, has a cylindrical marginal flange 69 confining a non-metallic ring gear insert 70 which is here shown to be identical with the ring gear insert 59, the insert 70 having eight parallel-sided radial slots 61' and intervening wedge-shaped teeth 62', and being rigidly secured to the disk 67 by countersunk screws 71. The cut-away cupped portion 34 of the bearing bracket 33 projects into the central space of the internal gear 52, as seen in FIGS. 2 and 3.

The output shaft 54, which is coaxial with the motor shaft, projects from the cover plate hub 38 and is journalled in a pair of ball-bearings 72 mounted in a liner sleeve 73 secured in the cover plate hub and also in a ball-bearing 74 mounted in the bore 42 of the bracket wall 41. The outer races of the bearings 72 are confined between snap-rings 75 in the liner sleeve, and a shaft seal 76 is mounted in the inner end of the sleeve. The output pinion gear 53, which has four teeth 77 similar to those of the pinion gear 51, is rigidly carried on the output shaft 54 in straddle-mounted relation between the cover plate 37 and the bracket wall 41 and is desirably formed integral with the output shaft. The central bore or opening 36 in the bracket is large enough to admit the output pinion gear 53, so as to facilitate assembly. The pinion gear 53, which is formed of hardened metal, such as steel, has a pitch diameter one half of the pitch diameter of the meshing internal gear 52.

The gearing and gear case form a gear-head, and the entire assembly including the motor forms a gear-head motor.

An axial-flow air impeller 78, which may be of the multiple-stage type, is fixedly mounted on the projecting end of the output shaft. With the gearing above described the impeller will be driven at a speed four times the motor speed. Axial thrust on the output shaft is resisted by the ball-bearing 72.

In operation, the induction motor 10 runs at a substantially constant speed of about 3500 r.p.m., and the internal gear 50 on the motor shaft drives the pinion gear 51 at twice this speed. In turn, the internal gear 52 rigidly coupled to the pinion gear 51 drives the output pinion gear 53 at twice the speed of the first pinion gear, so that the output shaft 54 is driven at a speed four times the motor speed, or approximately 14,000 r.p.m., which is a suitable operating speed for the air impeller 78. The impeller may be driven in either direction, and the air blast created can be utilized for various purposes. The air flowing to or from the impeller also passes through the longitudinal air ducts 49 disposed about the motor and gear case and serves to cool these parts.

Since each pinion gear requires only a relatively few teeth, these teeth can be of substantial size, so as to provide adequate strength, and the teeth of the meshing non-metallic internal gear insert can be made relatively wide in a peripheral direction. The parallel-sided radial slots in the internal gears can be easily and accurately formed, and the cylindrically curved teeth of the pinion gears can also be easily and accurately formed. The transmission operates smoothly and without excessive noise, and requires little or no lubrication.

The high-speed driven member may take other forms, such as cutting, grinding and polishing wheels, and cutting tools such as saws and shapers.

While the transmission gearing is particularly suitable for use as a speed increaser, it may also be used as a speed reducer.

I claim:

1. In a power transmission, a pair of relatively rotatable first and second intermeshing gears having parallel axes and respective pitch circles, said first gear being an internal gear with a central space and having an even number of parallel-sided radial slots of equal width spaced evenly about its pitch circle and opening at the inner and outer peripheries of said gear, said second gear extending within the central space of said internal gear and having a pitch diameter one-half the pitch diameter of said internal gear, said second gear having a small number of radially projecting external teeth spaced evenly about its pitch circle, the number of said teeth being one-half the number of radial slots in said internal gear, said teeth being cylindrically curved about a center lying in the pitch circle of said second gear and having a width slightly smaller than the width of the internal gear slots, said teeth being engageable in said internal gear slots during the relative rotation of said gears, and said gears maintaining a substantially constant velocity ratio during their relative rotation.

2. In a power transmission, a pair of relatively rotatable first and second intermeshing gears having parallel axes and respective pitch circles, said first gear being an internal gear including a non-metallic annular member with a central space and having an even number of laterally opening, parallel-sided radial slots of equal width spaced evenly about the pitch circle of said internal gear, said slots opening at the inner and outer peripheries of said first gear, said second gear extending within the central space of said annular member and having a pitch diameter one-half the pitch diameter of said internal gear, said second gear having a small number of radially projecting external teeth spaced evenly about its pitch circle, the number of said teeth being one-half the number of radial slots in said internal gear, said teeth being cylindrically curved about a center lying in the pitch circle of said second gear and having a width slightly smaller than the width of the internal gear slots, said teeth being engageable in said internal gear slots during the relative rotation of said gears, and said gears maintaining a substantially constant velocity ratio during their relative rotation.

3. In a power transmission, a pair of relatively rotatable first and second intermeshing gears having parallel axes and respective pitch circles, said first gear being an internal gear having a rotatable metal disk with a marginal flange and further having a non-metallic annular member confined at one side portion within said marginal flange and secured to a side wall of said disk in coaxial relation to said disk, said annular member having a central space and having at the opposite side portion an even number of parallel-sided radial slots of equal width spaced evenly about its pitch circle, said slots opening at the inner and outer peripheries of said annular member, said second gear extending within the central space of said internal gear and having a pitch diameter one-half the pitch diameter of said internal gear, said second gear having a small number of radially projecting external teeth spaced evenly about its pitch circle, the number of said teeth being one-half the number of radials slots in said internal gear, said teeth being cylindrically curved about a center lying in the pitch circle of said second gear and having a width slightly smaller than the width of the internal gear slots, said teeth being engageable in said internal gear slots during the relative rotation of said gears, and said gears maintaining a substantially constant velocity ratio during their relative rotation.

4. In a power transmission, a pair of relatively rotatable first and second intermeshing gears having parallel axes and respective pitch circles, said first gear being an internal gear having a metal support and further having a non-metallic annular member coaxially carried by said support at a side wall thereof, said annular member having a central space and having an even number of laterally opening, parallel-sided radial slots of equal width spaced evenly about the pitch circle of said internal gear and opening at the inner and outer peripheries of said internal gear, said radial slots forming teeth between them, fastening elements axially clamping said annular member to said support and passing through the midportions of said teeth in parallel relation to the axis of said annular member, said second gear extending within the central space of said internal gear and having a pitch diameter one-half the pitch diameter of said internal gear, said second gear having a small number of radially projecting external teeth spaced evenly about the pitch circle of said gear, the number of said external teeth being one-half the number of radial slots in said internal gear, said external teeth being cylindrically curved about a center lying in the pitch circle of said second gear and having a width slightly smaller than the width of the internal gear slots, said external teeth being engageable in said internal gear slots during the relative rotation of said gears, and said gears maintaining a substantially constant velocity ratio during their relative rotation.

5. In a power transmission, first and second coaxial rotary drive-transmitting members and a speed-changing gear train connecting said members, said gear train including first and second internal gears and first and second pinion gears, said internal gears having respective central spaces and respective equal pitch circles, said first and second pinion gears having respective equal pitch circles one-half the diameter of the pitch circles of the internal gears, said first internal gear being axially coupled to said first rotary member, said first pinion gear being rotatable on an axis parallel to the axis of said first internal gear and extending into the central space of said internal gear in meshing engagement with said internal gear, said second internal gear being axially coupled to said first pinion gear, said second pinion gear being axially coupled to said second drive-transmitting member and extending into the central space of said second internal gear in meshing engagement with said internal gear, each internal gear having an even number of parallel-sided radial slots of equal width spaced evenly about its pitch circle and opening at the inner and outer peripheries of said internal gear, each pinion gear having a small number of radially projecting external teeth spaced evenly about its pitch circle, the number of teeth on each pinion gear being one-half the number of radial slots in the meshing internal gear, the teeth on each pinion gear each being cylindrically curved about a center lying in the pitch circle of the pinion gear, and the diameter of the teeth of each pinion gear being slightly smaller than the width of the radial slots in the meshing internal gear.

6. In a power transmission, a rotary driving shaft, a rotary output shaft coaxial therewith, a first internal gear coupled to said driving shaft and having a pitch circle and a central space, said internal gear having an even number of laterally opening parallel-sided radial slots of equal width spaced evenly about its pitch circle, said slots opening at the inner and outer peripheries of said internal gear, gear casing means including a bearing stud disposed eccentrically with respect to the driving shaft and extending into the central space of said gear, the eccentricity of said stud being one-half the pitch radius of said internal gear, a pinion gear rotatably carried by said stud and extending within said central space of the internal gear in meshing engagement with said internal gear, said pinion gear having a pitch circle one-half the size of the pitch circle of said internal gear and having a small number of radially projecting teeth spaced evenly about the pitch circle of said pinion gear, the number of said teeth being one-half the number of radial slots in said internal gear, said pinion gear teeth being cylindrically curved about a radius lying in the pitch circle of said pinion gear, said teeth being slightly smaller than the width of said internal gear slots and engageable with the walls of said slots, a second internal gear coupled to said pinion gear and having a central space and a pitch circle of the same diameter as that of the first internal gear, said second internal gear having an even number of laterally opening parallel-sided radial slots of equal width spaced evenly about its pitch circle, said slots opening at the inner and outer peripheries of said second internal gear, and a second pinion gear carried by said output shaft and extending into the central space of said second internal gear, said second pinion gear having the same pitch circle as said first pinion gear and having a small number of radially projecting teeth, the number of said last-named teeth being one-half the number of radial slots in said second internal gear, said last-named teeth being cylindrically curved about a center lying in the pitch circle of said second pinion gear and having a width slightly smaller than the width of the radial slots in said second internal gear, and said last-named teeth being engageable with the walls of the radial slots in said second internal gear.

References Cited by the Examiner

UNITED STATES PATENTS

| | | | |
|---|---|---|---|
| 607,218 | 7/98 | Cobb | 74—413 X |
| 623,914 | 4/99 | Konrad | 74—413 |
| 1,604,401 | 10/26 | Fisher | 74—413 X |
| 1,833,159 | 11/31 | Garnett | 74—462 |
| 2,615,941 | 10/52 | Schrock | 310—83 |
| 2,717,968 | 9/55 | Lorenz | 310—83 |
| 2,851,896 | 9/58 | Ordway | 74—413 |
| 2,932,992 | 4/60 | Larsh | 74—461 X |
| 2,955,481 | 10/60 | Jackel | 74—461 X |

DON A. WAITE, *Primary Examiner.*